(12) United States Patent
Srikanteswara et al.

(10) Patent No.: US 10,631,170 B2
(45) Date of Patent: Apr. 21, 2020

(54) CLOUD BASED SPECTRUM MANAGEMENT

(71) Applicant: Intel Corporation, Santa Clara, CA (US)

(72) Inventors: Srikathyayani Srikanteswara, Portland, OR (US); Carlos Cordeiro, Portland, OR (US); Kerstin Johnsson, Palo Alto, CA (US); Anthony Lamarca, Seattle, WA (US); Jaideep Moses, Portland, OR (US); Wen-Ling Huang, Los Altos, CA (US); Christian Maciocco, Portland, OR (US); Shilpa Talwar, Los Altos, CA (US); Meiyuan Zhao, Santa Clara, CA (US); Jeffrey Foerster, Portland, OR (US); Xue Yang, Arcadia, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,406

(22) PCT Filed: Sep. 24, 2013

(86) PCT No.: PCT/US2013/061306
§ 371 (c)(1),
(2) Date: Dec. 18, 2013

(87) PCT Pub. No.: WO2015/047215
PCT Pub. Date: Apr. 2, 2015

(65) Prior Publication Data
US 2015/0087323 A1 Mar. 26, 2015

(51) Int. Cl.
*H04W 72/00* (2009.01)
*H04W 16/04* (2009.01)
*H04W 84/12* (2009.01)

(52) U.S. Cl.
CPC ............ *H04W 16/04* (2013.01); *H04W 84/12* (2013.01)

(58) Field of Classification Search
CPC ............ H04L 29/08108; H04W 72/04; H04W 24/00; H04W 4/14
(Continued)

(56) References Cited

U.S. PATENT DOCUMENTS

2004/0185814 A1* 9/2004 Inamori ............... H03G 1/0088
455/232.1
2007/0032254 A1 2/2007 Chen
(Continued)

FOREIGN PATENT DOCUMENTS

EP 2442603 A1 4/2012
JP 2007043714 2/2007
(Continued)

OTHER PUBLICATIONS

International Search Report and Written Opinion received for PCT Patent Application No. PCT/US2013/061306, dated Jun. 26, 2014, 11 Pages.
(Continued)

*Primary Examiner* — Matthew W Genack
(74) *Attorney, Agent, or Firm* — Schwegman Lundberg & Woessner, P.A.

(57) ABSTRACT

Certain embodiments herein are directed to managing wireless spectrum, which may include recommending or transmitting spectrum usage changes to one or more wireless devices. A spectrum management system comprising one or more computers may receive spectrum usage information associated with one or more wireless devices. The spectrum management system may generate a spectrum usage map based on the received information. Based on the spectrum usage map, a spectrum usage change is determined and
(Continued)

transmitted to one or more wireless devices. The wireless devices may change their operation in accordance with the spectrum usage change.

24 Claims, 4 Drawing Sheets

(58) Field of Classification Search
USPC .......................... 455/414.1, 450, 452.1, 466
See application file for complete search history.

(56) References Cited

U.S. PATENT DOCUMENTS

| | | | | |
|---|---|---|---|---|
| 2010/0105400 | A1* | 4/2010 | Palmer | H04W 16/24 455/450 |
| 2011/0125905 | A1* | 5/2011 | Baucke | H04M 15/00 709/226 |
| 2011/0176508 | A1* | 7/2011 | Altintas | H04W 72/085 370/329 |
| 2011/0194503 | A1* | 8/2011 | Stanforth | 370/329 |
| 2012/0015607 | A1* | 1/2012 | Koskela et al. | 455/62 |
| 2012/0063373 | A1 | 3/2012 | Chincholi et al. | |
| 2012/0115433 | A1 | 5/2012 | Young et al. | |
| 2012/0165059 | A1 | 6/2012 | Schmidt et al. | |
| 2013/0003591 | A1* | 1/2013 | Novak | H04W 36/06 370/252 |
| 2013/0231124 | A1* | 9/2013 | Vrzic et al. | 455/452.1 |
| 2014/0086177 | A1* | 3/2014 | Adjakple | H04W 12/08 370/329 |
| 2014/0112119 | A1* | 4/2014 | Chen | H04W 36/0022 370/216 |
| 2014/0156902 | A1* | 6/2014 | Kesling | G06F 13/28 710/308 |
| 2014/0220999 | A1* | 8/2014 | Cordeiro | H04W 16/14 455/454 |

FOREIGN PATENT DOCUMENTS

| | | |
|---|---|---|
| JP | 2010081435 | 4/2010 |
| JP | 2011109508 | 6/2011 |
| JP | 2016536825 | 11/2016 |
| JP | 6227763 | 11/2017 |
| KR | 20120097547 | 9/2012 |
| KR | 20120139747 A | 12/2012 |
| KR | 20160035022 | 3/2016 |
| KR | 101861704 | 5/2018 |
| WO | 2012064521 | 5/2012 |
| WO | 2015047215 | 4/2015 |

OTHER PUBLICATIONS

Office Action for Korean Application No. 2016-7004686, dated Nov. 16, 2016, 12 pages (5 pages English translation).
First Office Action for Japanese Application No. 2016-516532, dated Mar. 21, 2017, 10 pages (5 pages English translation).
Office Action for Korean Application No. 2016-7004686, dated May 26, 2017, 11 pages (5 pages English translation).
Final Rejection for Korean Application No. 2016-7004686, dated Nov. 24, 2017 (3 pages Korean, 3 Pages English Translation).
"International Application Serial No. PCT US2013 061306, International Preliminary Report on Patentability dated Apr. 7, 2016", 8 pgs.
"Korean Application Serial No. 10-2016-7004686, Response filed Jan. 13, 2017 to Office Action dated Nov. 16, 2016", w English Claims, 14 pgs.
"Korean Application Serial No. 10-2016-7004686, Response filed Jul. 26, 2017 to Office Action dated May 26, 2017", w English Claims, 11 pgs.
"Korean Application Serial No. 10-2016-7004686, Response filed Jan. 26, 2018 to Final Office Action dated Nov. 24, 2017", w English Claims, 14 pgs.

* cited by examiner

CLOUD BASED SPECTRUM MANAGEMENT

CROSS-REFERENCE TO RELATED APPLICATIONS

This application is a national stage filing under 371 and claims the benefit of priority of PCT/US2013/061306, filed Sep. 24, 2013, entitled "Cloud Based Spectrum Management." The foregoing application is hereby incorporated by reference in its entirety.

BACKGROUND

Wireless spectrum may enable users of wireless devices to communicate data, text, voice, video, multimedia, or other information over the wireless spectrum. Currently, wireless spectrum and channel bandwidth is fixed and does not vary. However, as demand for communication over wireless networks fluctuates, fixed wireless spectrum allocation and channel bandwidth may result in inefficient use of an operator's wireless spectrum. Existing processes for reallocating spectrum may have large lead times and may be too infrequent to meet evolving demands that users place on an operator's network. Such circumstances may lead to an inability to meet user demand for information, poor utilization of an operator's wireless network, and/or other unfortunate consequences.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Certain embodiments herein are directed to, among other things, the dynamic management of wireless spectrum for utilization by operator networks. An operator network may enable users of mobile devices, such as cellular phones or other devices configured for wireless communication, to send and receive content over a wireless network. A certain amount of wireless spectrum may be dedicated for such communication by a government or other entity that controls or provides frequencies associated with the wireless spectrum for communicating the content. Certain embodiments herein relate to managing the wireless spectrum for use by operator networks for servicing their customers, and changing wireless spectrum usage based on information from wireless devices currently using the wireless spectrum. Put another way, using certain techniques described herein, wireless devices may be instructed to use portions of spectrum to optimize the limited amount of spectrum divided or split among operator networks.

In one embodiment, the management of the wireless spectrum may be determined based on information from wireless devices using the wireless spectrum. Information from wireless devices may include information associated with users of the wireless devices, such as a geographic location of the wireless device, or relative location of the wireless device to an access point, base station, cellular tower, or similar device. Information from such wireless devices may also include information related to applications executed by the wireless device, as well as bandwidth requirements for the application or wireless device. Systems and methods herein may relate to analyzing such information to determine recommended changes in spectrum usage.

Figure 1:
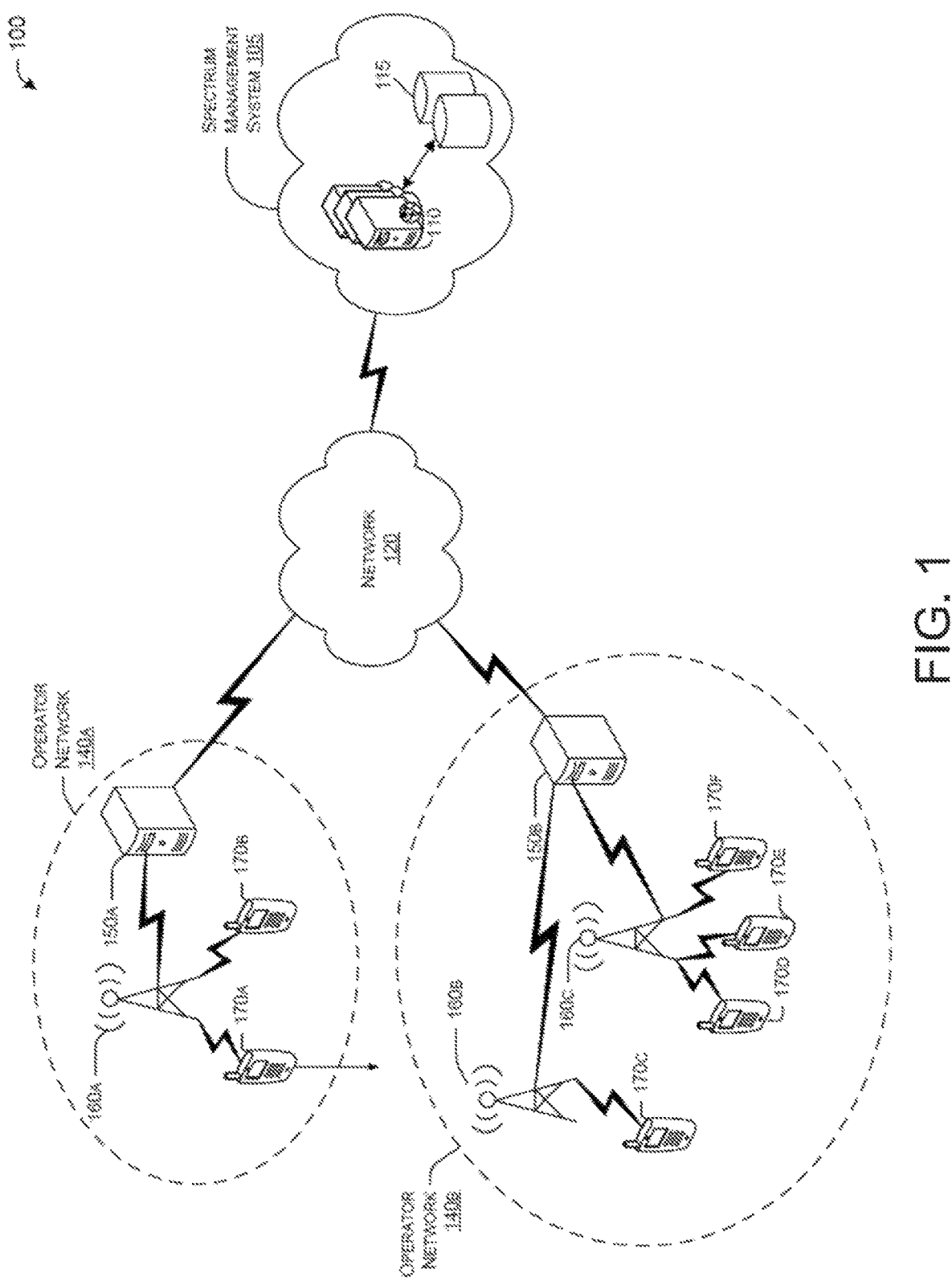
FIG. 1 illustrates an example wireless communication system that may be used to implement wireless spectrum management, according to an embodiment of the disclosure.

FIG. 1 depicts an example wireless communication system 100 that may be used to implement wireless spectrum management, according to an embodiment of the disclosure. As shown in FIG. 1, a spectrum management system 105 may include one or more spectrum management devices 110, data stores 115, and other devices or components for implementing or facilitating the processed described herein. According to one configuration, the spectrum management device 110 may communicate with devices in operator network(s) 140a and 140b, such as operator devices 150a and 150b, among other devices. In one example, the spectrum management device 110 may receive information associated with in-use wireless spectrum ("spectrum usage information") and demand for wireless spectrum from operator devices 150a and 150b, as well as from mobile devices 170a-170f. The spectrum management device 110 may determine a change to a usage of wireless spectrum based on such information, as will be described in greater detail below.

Although a certain number of each system, device, or network is shown in FIG. 1, a different number of each may exist in other examples. For example, numerous operator networks 140 that provide wireless services for users of the mobile devices 170a-170f may participate in a determination for using wireless spectrum. Each of the systems or devices will now be described in turn.

Some configurations of the spectrum management system 105 may include a cloud computing arrangement in which shared computing resources, such as those described above, may perform one or more services associated with implementing the processes described herein.

Other configurations may exist in other embodiments, including those in which functions described herein may be distributed among multiple systems or devices, or may be performed by a dedicated device.

As described, spectrum management system 105 may store information associated with wireless spectrum allocation. For example, spectrum management system 105 may store allocation information controlled by a government or other entity that may control access to electromagnetic waves in various geographical regions. Such entities may allocate a portion of the electromagnetic waves for certain types of communication, such as that for wireless, video, radio, etc. The allocation may include a certain frequency or range of frequencies. For example, a certain range of frequencies may be dedicated for wireless communication for use by users of mobile devices to send and receive content over electromagnetic waves associated with at least a portion of the frequencies. Spectrum management system 105 may also store and collect spectrum usage information, as will be further described herein.

An amount of wireless spectrum as used herein may refer to a certain number of frequencies that may be available within a frequency band or block of frequencies. For example, the 800 MHz frequency band may include frequencies 790 MHz-862 MHz. An amount of available spectrum (e.g., 25 MHz) may include frequencies 810 MHz-834 MHz, or another portion or range of frequencies equivalent to 25 MHz in the 800 MHz frequency band. Numerous other amounts of wireless spectrum, corresponding numbers of frequencies, frequency bands, etc., may exist in other examples.

The operator network 140 may include various systems, devices, or components that may configure the operator network 140 to enable wireless communication via the wireless spectrum. An operator network 140 may be owned, controlled, or managed by various service providers, such as wireless service providers, telecommunications service providers, or other providers that may be licensed to utilize one or more frequencies associated with the wireless spectrum. In certain embodiments herein, the service providers may provide cellular communication services to users of mobile devices, mobile telephones, or other devices that may include a radio. The service providers may compete for a limited amount of wireless spectrum to facilitate such services, as will be explained below.

According to one configuration, example devices in an operator network 140, such as operator network 140b may include, but are not limited to, an operator device 150b (or a mobile switching center), base stations 160b and 160c, and mobile user devices 170c-f. Fewer or more of the devices shown in the operator networks 140a and 140b may exist in other embodiments. The operator devices 150a-150b may serve as controllers for the operator networks 140a-140b, in one embodiment. For example, the operator device 150b may coordinate the actions of the base stations 160b and 160c, for example, as mobile devices 170c-f move between cells covered by the base stations 160b and 160c. In another example, the operator device 150 may also serve as a switch for routing cellular communications into, or receiving communications from, the Public Switched Telecommunications Network (PSTN) or other networks. In a further example, the operator device 150 may also communicate with one or more visitor location registers (VLRs) and/or home location registers (HLRs) to access information associated with the mobile devices 170c-f, such as, but not limited to, a unique international mobile subscriber identity (IMSI), the services allowed for each IMSI, locations (e.g., last known location) of the mobile devices 170c-f, and authentication data used to determine access to the operator network 140 for each mobile device 170c-f. In yet another example, the operator device 150 may perform billing operations, such as generating bills for users of the mobile devices 170c-f based on usage or other contractual terms which may be stored in registers, databases, other data stores, etc., accessible by the operator device 150.

Various communication links, including fiber optic links, cable links, microwave links configured to utilize wireless spectrum as described herein, etc., may connect the operator device 150b to PSTN devices (not shown), to the base stations 160b and 160c, and to the spectrum management device 110 in the spectrum management system 105, in one embodiment.

The base stations 160a, 160b, and/or 160c may be a wireless communication station installed at a fixed location to facilitate communication over various types of networks, such as cellular Code Division Multiple Access (CDMA), Global System for Mobile Communications (GSM), Long Term Evolution (LTE), wireless local loop, wide area network (WAN), wireless fidelity (WiFi), Worldwide Interoperability for Microwave Access (WiMax), etc. The base stations 160a, 160b, and/or 160c may include a base transceiver station, a base station controller, and other components to facilitate such communication, in one configuration.

The base station controller may interface with the operator device 150b and may determine to which base stations 160b or 160c to route content, such as a voice call. The base station controller may route information to a particular base station 160 (for example, based on a geographic location of the base station 160b or 160c) in response to the operator network 140 winning a bid for available wireless spectrum. As described herein, such information may reconfigure the base stations 160b and/or 160c to communicate over wireless spectrum that includes a different range of frequencies than utilized at the previous interval of propagation.

The base station controller may also interface with base transceiver stations (or radio base stations), which may communicate directly with the mobile devices 170a-f. A base transceiver station may include various components, such as an electronics section and one or more antennas. The electronics section may include electronics for implementing communication with the mobile devices 170a-f. Such electronics may include radio frequency (RF) amplifiers, radio transceivers, RF combiners, and power supplies with redundant power sources, among other electronics. The one or more antennas may convert electric power into radio waves, and vice versa, for use by the base transceiver station. In some configurations, the base stations transceiver may be coupled to two sets of receive antennas to provide diversity reception, for example, to reduce the effects of multipath propagation.

The mobile devices 170a-f may include hardware and/or software modules that may enable the mobile devices 170a-f to communicate with a respective base station for sending information to the operator devices 150a-b. In one embodiment, the mobile devices 170a-f may include software drivers that enable such communication. The software drivers may configure the mobile devices 170a-f to use certain allocations of wireless spectrum or frequencies. Such allocations may be based on various types of auctions or on other types of determinations.

According to one example, an operator device 150, or a mobile device 170, may transmit spectrum usage information to the spectrum management system 105. In the case of operator device 150, the operator device 150 may transmit spectrum usage information for one or more mobile devices to the spectrum management system 105. Additionally, a mobile device 170 may transmit spectrum usage information to spectrum management system 105 through network 120.

The spectrum usage information may be received by spectrum management system 105 in real-time, substantially real-time, or near real-time such that an operator device 150 or mobile device 170 may receive a spectrum usage change to optimize wireless spectrum usage. Such spectrum usage information is described in further detail below.

At least a portion of the devices shown in FIG. 1 may include a radio receiver (not shown). A physical layer interface in the radio receiver may include a radio frequency (RF) unit that may be configured to provide for reception of one or more RF signals. According to one configuration, the RF unit may include an amplifier, a mixer, a local oscillator, and so forth. The RF unit may be implemented as discrete electronic components, integrated circuits, software-defined radio, or a combination thereof, according to various configurations. At least a portion of the devices in FIG. 1 may also include a radio transmitter that may enable the devices to send one or more RF signals to one another. In some configurations, the devices may include a radio transceiver that may receive and send RF signals. The transceiver (or the receiver and/or the transmitter) may be coupled to one or more antennas, such as those associated with the operator network 140.

Figure 2:
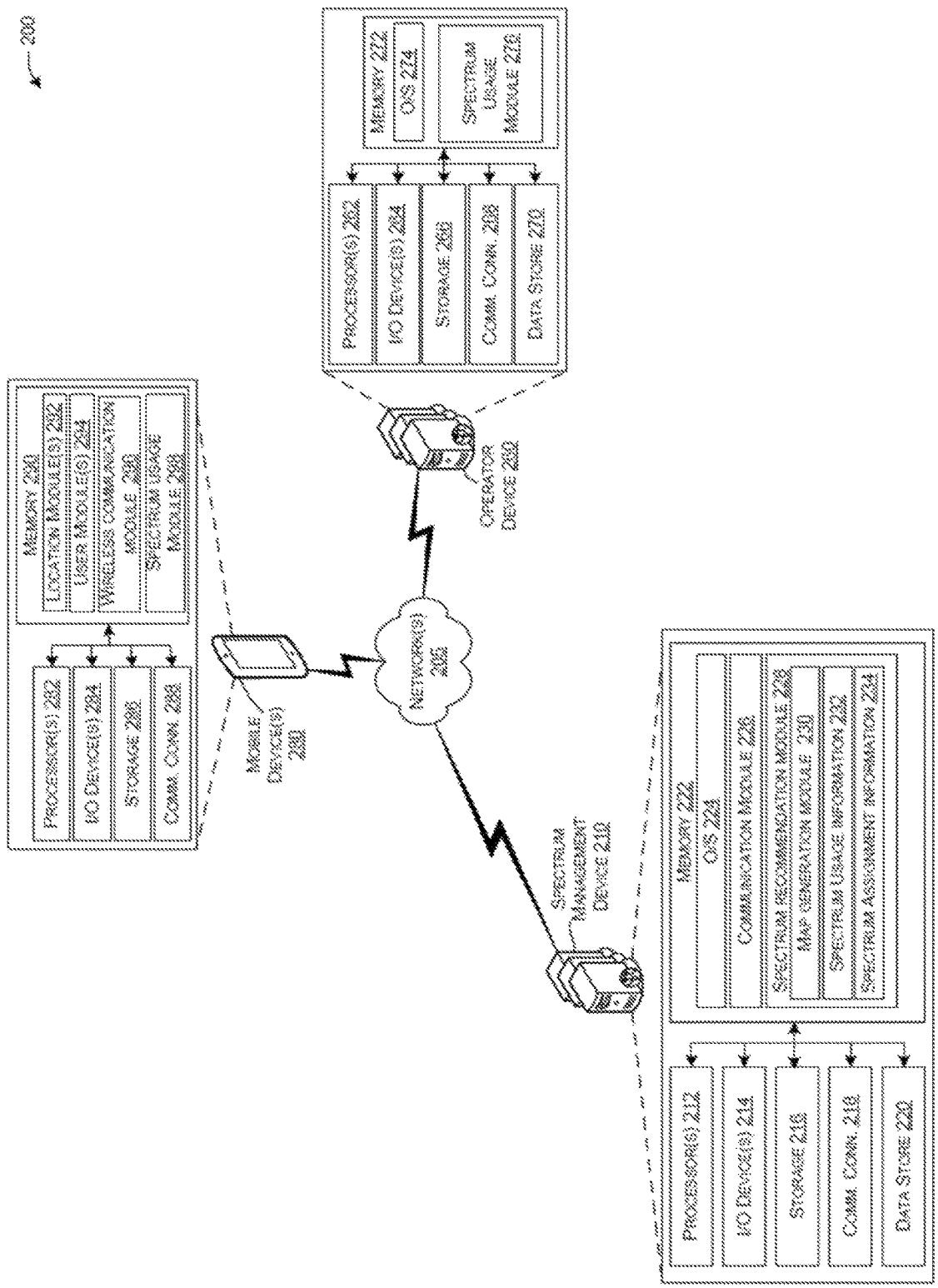
FIG. 2 illustrates a block diagram of an example computing system for implementing wireless spectrum management, according to an embodiment of the disclosure.

FIG. 2 depicts a block diagram of an example computing system 200 for implementing dynamic allocation of wireless spectrum, according to an embodiment of the disclosure. The computing system 200 may include, but is not limited to, a spectrum management device 210, an operator device 260, and a mobile device 280. Although only one of each device is shown, more may exist in other embodiments. As described above, the devices in FIG. 2 may communicate with one another over the one or more networks 205 to facilitate the processes described herein. For example, the spectrum management device 210 may receive spectrum usage information from the user device 280 or operator device 260, may generate a spectrum usage map, and may transmit information associated with a spectrum usage change to a user device 280. The operator device 260 may communicate with various systems and/or devices, such as the base stations 160a, 160b, and 160c in FIG. 1, to send content to, or receive content from, the mobile devices 170a-f. Various other communications between the devices in FIG. 2 may exist in other examples.

As used herein, the term "device" may refer to any computing component that includes one or more processors that can be configured to execute computer-readable, computer-implemented, or computer-executable instructions. Example devices may include personal computers, server computers, server farms, digital assistants, smart phones, personal digital assistants, digital tablets, Internet appliances, application-specific circuits, microcontrollers, minicomputers, transceivers, or customer premise equipment such as set-top boxes, kiosks, or other processor-based devices. The execution of suitable computer-implemented instructions by one or more processors associated with various devices may form special purpose computers or other particular machines that may implement or facilitate the processes described herein.

The one or more networks 205 may facilitate communication between the devices shown in FIG. 2, as well as other devices. The one or more networks 205 may include any number of wired or wireless networks that may enable various computing devices in the example computing system 200 to communicate with one another. In certain embodiments herein, the wireless networks may include, but are not limited to, CDMA, GSM, wireless local loop, WAN, WiFi, and WiMax. In some embodiments, other networks, intranets, or combinations of different types of networks may be used including, but not limited to, the Internet, intranets, cable networks, cellular networks, landline-based networks, radio networks, satellite networks, WiFi Direct networks, Bluetooth® networks, or other communication mediums connecting multiple computing devices to one another. Other embodiments may not involve a network and may, for example, provide features on a single device or on devices that are directly connected to one another.

The devices in FIG. 2 may include one or more processors configured to communicate with one or more memory devices and various other components or devices. For example, the spectrum management device 210 may include one or more processors 212, one or more input/output (I/O) devices 214, storage 216, one or more communication connections 218, and one or more data stores 220. The processor 212 may be implemented as appropriate in hardware, software, firmware, or a combination thereof. The processors 262 and 282 associated with the operator device 260 and the mobile device 280 may be the same or at least similar to the processor 212, in one embodiment.

The memory 222 may store program instructions that are loadable and executable on the processor 212, as well as data generated during the execution of these programs. Depending on the configuration and type of spectrum management device 210, the memory 222 may include one or more types of volatile and/or non-volatile memory. Example memory may include, but is not limited to, random access memory (RAM), static random access memory (SRAM), dynamic random access memory (DRAM), read-only memory (ROM), and flash memory. The memory 272 and 290 associated with the operator device 260 and the mobile device 280 may be the same or at least similar to the memory 222, in one embodiment.

The storage 216 may include removable and/or non-removable storage including, but not limited to, magnetic storage, optical disks, non-volatile memory, and/or tape storage. The disk drives and their associated computer-readable media may provide non-volatile storage of computer-readable instructions, data structures, program modules, and other data for the computing devices. The storage 266 and 286 associated with the operator device 260 and the mobile device 280 may be the same or at least similar to the storage 216, in one embodiment.

The memory 222 and the storage 216, both removable and non-removable, are all examples of computer-readable storage media. For example, computer-readable storage media may include volatile and non-volatile, removable and non-removable media implemented in any method or technology for storing information such as computer-readable instructions, data structures, program modules, or other data.

The one or more communication connections 218 may allow the spectrum management device 210 to communicate with other devices, such as the operator device 260, databases, and various other devices that may exist on the one or more networks 205. The one or more communication connections 268 and 288 associated with the operator device 260) and the mobile device 280 may be the same or at least similar to the one or more communication connections 218, in one embodiment.

The I/O devices 214 may enable a user to interact with the spectrum management device 210 to perform various functions, including installing and configuring databases, software, and/or program modules, etc., for implementing or facilitating the processes described herein. The I/O devices 214 may include a keyboard, a mouse, a pen, a voice input device, a touch input device, a display, a camera or an imaging device, speakers, a printer, etc. The I/O devices 264 and 284 associated with the operator device 260 and the mobile device 280 may be the same or at least similar to the I/O devices 214, in one embodiment.

The one or more data stores 220 may store lists, arrays, databases, flat files, etc. In some implementations, the data stores 220 may be stored in memory external to the spectrum management device 210 but may be accessible via the one or more networks 205, such as with a cloud storage service. The data stores 220 may store information that may facilitate the processes described herein. Such information may include, but is not limited to, spectrum usage information, historical spectrum usage trends, wireless device information, user movement patterns, etc. The one or more data stores 270 associated with the operator device 260 may be the same or at least similar to the one or more data stores 220, in one embodiment.

The memory 222 may also store an operating system (O/S) 224 and various software applications and/or modules that may implement or facilitate the processes described herein. Example modules may include, but are not limited to, a communication module 226, a spectrum recommendation module 228, and a map generation module 230. Each of these modules may be implemented as individual modules that provide specific functionality associated with the dynamic allocation of wireless spectrum. Alternatively, one or more of the modules may perform all or at least some of the functionality associated with the other modules.

The communication module 226 may configure the spectrum management device 210 to communicate with the devices shown in FIG. 2. The communication module 226 may utilize various protocols to enable such communication including, but not limited to, Transmission Control Protocol/Internet Protocol (TCP/IP), socket-based protocols such as the WebSocket protocol, Simple Mail Transfer Protocol (SMTP) for transmitting messages via electronic mail, Short Message Service (SMS) text messaging for supporting communication with a mobile device, Hypertext Transfer Protocol (HTTP), or other message formats and/or rules for exchanging information between the spectrum management device 210 and the devices in FIG. 2.

An example communication enabled by the communication module 226 may include receiving messages that include spectrum usage information from the operator device 260 and the mobile device 280. In some embodiments, the communication module 226 may further parse the messages to extract information for use in the determinations described herein. The messages may be formatted in a manner that allows such extraction. Example formats may include CSV format, text-delimited formats, extensible markup language format, or other formats in which information is organized in a fashion that allows the communication module 226 to extract and identify the information in the messages. The communication module 226 may also construct messages for distribution to other devices in FIG. 2 using one or more of these formats such that a device receiving the messages may also extract information from the messages, in certain embodiments. Various other types of communications, formats, etc., may exist in other embodiments.

The spectrum recommendation module 228 may determine a change in the spectrum usage for an operator device 260 or mobile device 280. As used herein, determining a change in spectrum usage may refer to the process of instructing or recommending a user device to utilize different frequency bands, different channels, or different modes of wireless communication to optimize a user experience. Such a determination may be based on various criteria and/or techniques that may consider various factors in identifying the change in spectrum usage. Techniques that will be described herein may be based on various factors, such as time (for example, utilization time of wireless spectrum), operator network operational parameters, historical data, and various mathematical techniques, as non-limiting examples.

The spectrum recommendation module 228 may include a map generation module 230, spectrum usage information 232, and spectrum assignment information 234, which may be used to determine a recommendation or change in spectrum usage, in certain embodiments. The map generation module 230 may perform various functions to make such a determination. One such function may include receiving or collecting data (i.e., spectrum usage information 232) associated with wireless spectrum usage. In one embodiment, such information may be received from one or more user devices 280. In one aspect of the embodiment, the information may include current usage of wireless spectrum by the user devices 280. In one aspect of the embodiment, the information may include data generated by various sensors of user device 280, such as an accelerometer or a location module. The map generation module 228 may also store or have access to spectrum assignment information 234. Such spectrum assignment information 234 may identify specific operators associated with various portions of licensed wireless spectrum, and also may include information relating to unlicensed wireless spectrum.

The above descriptions associated with the spectrum management device 210 are not meant to be limiting. Numerous other configurations may exist in other embodiments. For example, the functions described above may be performed by one or any number of modules associated with the spectrum management device 210 or another device in FIG. 2.

The memory 272 of the operator device 260 may include one or more modules for implementing processes associated with providing wireless communication services to users of the mobile devices 280, among other functions. In one embodiment, such functions may be performed by the spectrum usage module 276.

The spectrum usage module 276 may monitor an operator network (for example, the operator network 140 in FIG. 1) to determine a demand for wireless communication and how wireless spectrum usage is being used by mobile devices 280 of the operator network. The spectrum usage module 276 may aggregate spectrum usage information from multiple mobile devices 280, and transmit the information to a spectrum management device 210.

The mobile devices 280 may be utilized by users to send and receive content over the one or more wireless networks 205. The memory 290 of the mobile device 280 may include various software and/or modules (for example, location modules 292, user modules 294) that may enable communication of the content, interaction with the content, and/or other functions. Location modules 292 may determine the location of the mobile device 280 using, for example, global positioning system technology, assisted global positioning system technology, Wi-Fi location, and other location determination techniques. The memory 290 may also include a wireless communication module 296, which may include one or more device drivers that configure the mobile device 280 to communicate over the network 205. In certain embodiments, the wireless communication module 296 may receive an indication from the operator device 260 or the spectrum management device 210 of a change in spectrum usage. In response, the wireless communication module 294 may reconfigure the mobile device 280 to utilize the wireless spectrum in accordance with the spectrum usage change. The wireless communication module 294 may also send a message associated with the reconfiguration to the operator device 260. The message may include an indication that the mobile device 280 was successfully or unsuccessfully reconfigured, among other information. The memory 290 may also include a spectrum usage module 298, which may enable communication of spectrum usage information of mobile device 280 to spectrum management system 210. Such spectrum usage information may include a geographic location for the mobile device 280, the relative location of mobile device 280 as compared to an access point or cellular tower, one or more applications used by mobile device 280, bandwidth requirements for mobile device 280 or applications executing on mobile device 280, channel conditions for the mobile device 280, and/or information regarding the interference environment of mobile device 280. Spectrum usage information may also include characteristics associated with the mobile device 280, such as data related to how many radios mobile device 280 is equipped with, the various frequency bands for each radio, and other such information.

The above descriptions and examples are for purposes of illustration and are not meant to be limiting. Additional descriptions and examples may exist in other embodiments. For example, at least a portion of the functionality described in association with certain devices may be performed by one or more other devices. In this way, the described functionality may be distributed among one or any number or combination of devices. As another example, different modules for implementing other types of functionality, types of communication, etc., in support of managing wireless spectrum and utilizing the wireless spectrum in an operator network may also exist.

Figure 3:
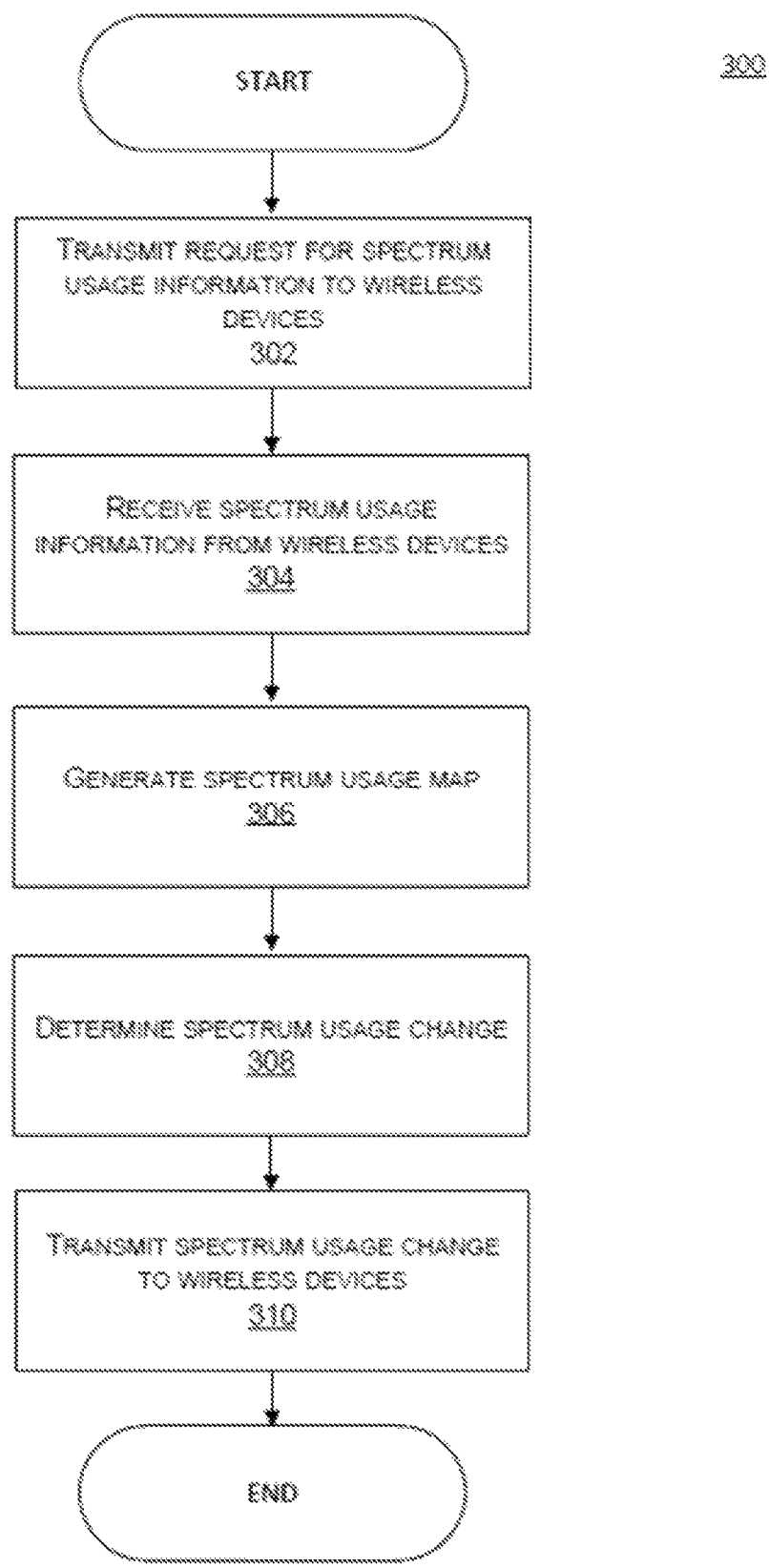
FIG. 3 illustrates a flow diagram of an example process for managing wireless spectrum, according to an embodiment of the disclosure.

FIG. 3 illustrates a flow diagram of an example process 300 for managing wireless spectrum, according to an embodiment of the disclosure. In one embodiment, the example process may be performed by the spectrum management device 210 in FIG. 2. The example process may begin at block 302, where a request for spectrum usage information is transmitted to one or more wireless devices. In one embodiment, the request may be transmitted by an operator device 260 or spectrum management system 210 to one or more mobile devices 280. The request for spectrum usage information may be transmitted on a periodic basis, such as every 30 minutes, or at another time interval. Spectrum usage information may also be transmitted from a wireless device in response to a user of the wireless device activating a particular application on the wireless device. Spectrum usage information may also be transmitted from a wireless device in response to movement of the wireless device. Further details with regard to requesting spectrum usage information are included below.

At block 304, spectrum usage information associated with one or more wireless devices is received. In one embodiment, spectrum usage information may be received from wireless devices (e.g. mobile devices 280) directly. Additionally or alternatively, spectrum usage information may be received from an operator device 260. In one embodiment, spectrum usage information is received by a spectrum management system 210. The received spectrum usage information may include dynamic information, such as a geographic location for a wireless device, signal strength for a wireless device, a relative location between a wireless device and an access point, an indication of an application executing on the wireless device, bandwidth requirements for the wireless device or for an application executing on the wireless device, channel conditions for a wireless device, and/or information relating to an interference environment of a wireless device. Further, the dynamic information may include information received from various sensors on the wireless device, such as an accelerometer, gyroscope, digital compass, or barometer. The received spectrum usage information may further include static information, such as characteristics of a wireless device. Such characteristics may include a unique identifier for the wireless device, a number of radios on the wireless device, frequencies supported by the radios of the wireless device, and other such data. The unique identifier for the wireless device may be, in one embodiment, a media access control (MAC) address of a network interface of the wireless device, or an International Mobile Subscriber Identity (IMSI) or International Mobile Station Equipment Identity (IMEI) of a cellular radio of the wireless device.

At block 306, a spectrum usage map is generated based on the received spectrum usage information. Depending on the configuration of spectrum management system 210, the generated spectrum usage map may cover a specified area, such as a square mile, or a smaller or larger area, as desired. The spectrum usage map may utilize colors to represent different frequencies, strengths of signals, or other characteristics of the wireless spectrum in the mapped area. The spectrum usage map may also be generated based on historical information. For example, typical user movement patterns may be analyzed, and such data may be included in the generation of the spectrum usage map. Similarly, information reflecting spectrum usage over various time periods may be included in the generation of the spectrum usage map.

At block 308, based on the spectrum usage map, a spectrum usage change is determined. Such a determination may be based at least in part on potential interference. For example, if a particular base station or cellular tower is serving multiple devices, as shown in a spectrum usage map, a spectrum usage change may instruct one or more wireless devices to switch to another base station or cellular tower. Similarly, if a particular base station or cellular tower is experiencing a heavy traffic load, a spectrum usage change may instruct or suggest one or more wireless devices to employ another communication mode. The spectrum usage change may encompass any number of changes to spectrum usage. For example, the spectrum usage change may include an indication of a different frequency band to be used by a wireless device. Thus, for example, the wireless device may be instructed to change from a 900 MHz band to a 2100 MHz band. Additionally, the spectrum usage change may include an indication of a different channel to be used by a wireless device. The spectrum usage change may also include an indication of a different network to be used by a wireless device. For example, the spectrum usage change may instruct a wireless device to switch from cellular data usage to Wi-Fi usage (i.e. switch from licensed spectrum to unlicensed spectrum). As a further example, the spectrum usage change may instruct a wireless device to switch to a portion of spectrum that has recently become unused.

At block 310, the spectrum usage change is transmitted to one or more wireless devices. The wireless devices (e.g. mobile devices 280) that receive the spectrum usage change may be the same as or different from the wireless devices from which spectrum usage information is received. The wireless devices may change their wireless spectrum usage or other operation in accordance with the spectrum usage change to improve data throughput or improve cellular reception. Such a change may not be perceptible to a user of a wireless device, and the user may not experience any interruption of service.

Figure 4:
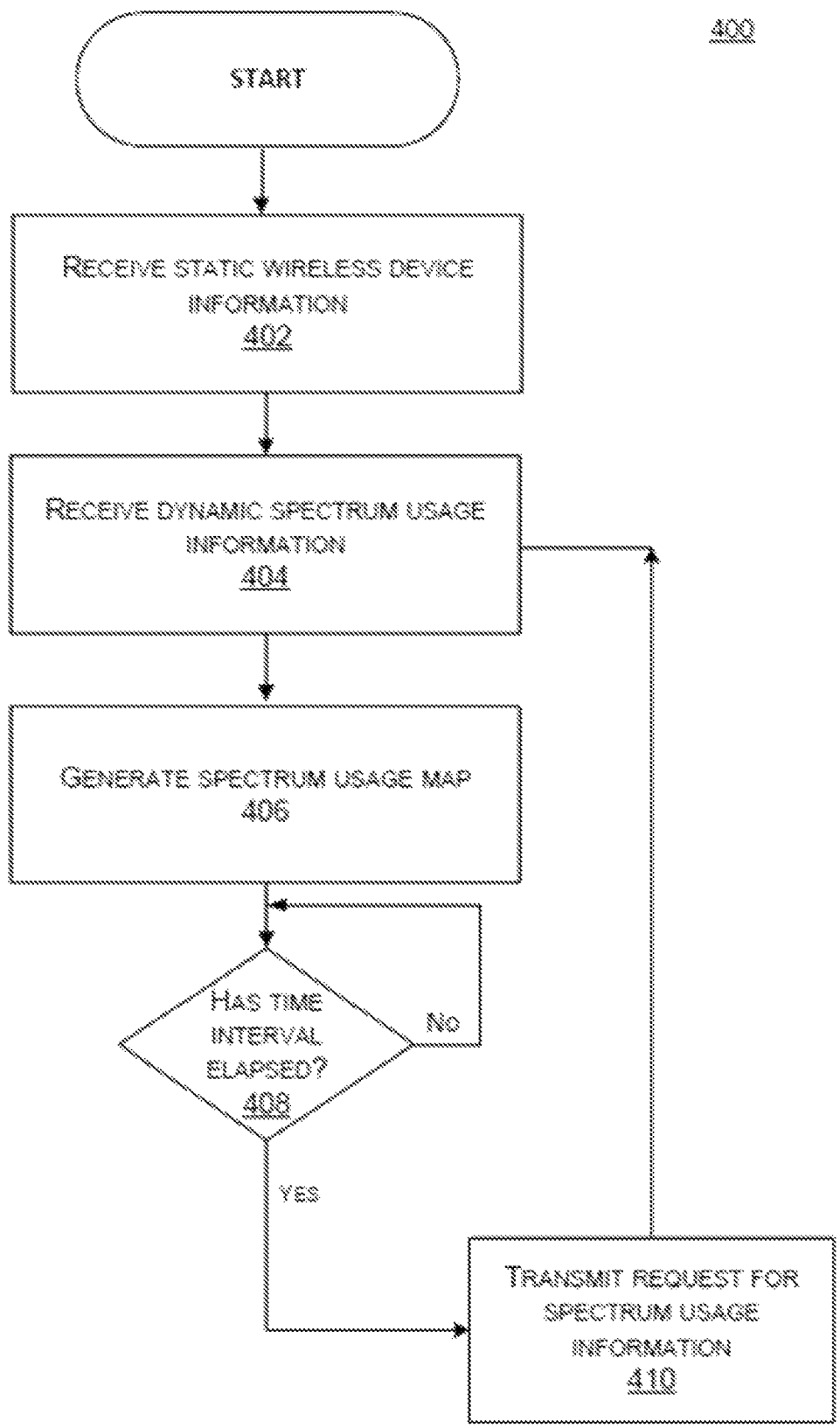
FIG. 4 illustrates a flow diagram of an example process for generating a spectrum usage map, according to an embodiment of the disclosure.

FIG. 4 illustrates a flow diagram of an example process 400 for generating a spectrum usage map, according to an embodiment of the disclosure. In one embodiment, the example process may be performed by the spectrum management device 210 in FIG. 2. The example process may begin at block 402, where static wireless device information is received from one or more wireless devices. Such static wireless device information may include a number of radios present on a wireless device, and a list of frequencies supported by each radio on a wireless device. Static wireless device information may also include sensors present on a wireless device. Static wireless device information may be collected, in one embodiment, when a wireless device registers or connects to an operator device 260. Static wireless device information may be received by an operator device 260 or by a spectrum management device 210.

At block 404, dynamic spectrum usage information is received from one or more wireless devices. As described above, such dynamic spectrum usage information may be received by an operator device 260 or by a spectrum management device 210. Dynamic spectrum usage information may include, as described above, information such as a geographic location for each wireless device, a relative location between a wireless device and an access point, an indication of an application executing on the wireless device, bandwidth requirements for the wireless device or for an application executing on the wireless device, channel conditions for a wireless device, and/or information relating to an interference environment of a wireless device. Further, the dynamic information may include information received from various sensors on the wireless device. Dynamic spectrum usage information may be received in response to a request from a spectrum management device 210, or in response to a user activating an application on a mobile device 280.

At block 406, a spectrum usage map is generated. As described above, the generated spectrum usage map may cover a desired area depending on the configuration of spectrum management system 210.

At block 408, a determination of whether a time interval has elapsed is performed. The time interval, in one embodiment, may be ten minutes, an hour, or any other desired time period. If the time period has not elapsed, method 400 remains at block 408 until the time interval elapses. If the time period has elapsed, method 400 proceeds to block 410, where a request for dynamic spectrum usage information may be transmitted to one or more wireless devices. Method 400 may then return to block 404.

Receiving updated spectrum usage information periodically as described with reference to method 400 may allow a spectrum management device 210 to frequently transmit spectrum usage changes to wireless devices. In this way, spectrum management device 210 may optimize the experience of wireless device users by allowing the users' wireless devices to connect to networks and use wireless spectrum with as little interference as possible.

Returning to FIG. 1, an example in accordance with one or more embodiments of the disclosure follows. As an initial state, mobile device 170a may be associated with and communicating with base station 160a, which is part of operator network 140a. As a user of mobile device 170a begins moving, mobile device 170a may transmit spectrum usage information to spectrum management system 105 indicating such movement. For example, accelerometer data or location data from mobile device 170a may be transmitted to spectrum management system 105. Spectrum management system 105, upon generating a spectrum usage map, may determine that mobile device 170a would be better served by communicating with base station 160b, which is shown as part of operator network 140b. Spectrum management system 105 may transmit this change to mobile device 170a, which in turn may alter its spectrum usage such that it communicates with base station 160b. In one embodiment, in determining a spectrum usage change, the spectrum management system 105 may consider a roaming arrangement between operator network 140a and operator network 140b, or may consider whether the radios present on mobile device 170a are compatible with operator network 140b.

Similarly, as another example, mobile device 170d may be initially associated with and communicating with base station 160c. However, base station 160c may be overloaded, as shown in FIG. 1, as multiple mobile devices are connected to it. Mobile device 170d may transmit spectrum usage information to spectrum management system 105 indicating such network characteristics. Alternatively, operator device 150b may transmit such spectrum usage information. In response, spectrum management system 105, upon generating a spectrum usage map, may determine that mobile device 170d would be better served by communicating with base station 160b. Spectrum management system 105 may transmit this change to mobile device 170d, which in turn may alter its spectrum usage such that it communicates with base station 160b.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions. Conditional language, such as, among others. "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation. The patentable scope of certain embodiments of the present disclosure is defined in the claims, and may include other examples that occur to those skilled in the art.

EXAMPLES

Example 1 is a method for managing wireless spectrum. The method may include receiving, by a spectrum management system comprising one or more computers, from a first one or more wireless devices, spectrum usage information associated with each wireless device; generating, by the spectrum management system, a spectrum usage map based on the received spectrum usage information; determining, by the spectrum management system, a spectrum usage change based on the spectrum usage map; and transmitting, by the spectrum management system and to a second one or more wireless devices, the spectrum usage change.

In Example 2, the subject matter of Example 1 can optionally include transmitting, by the spectrum management system, to the first one or more wireless devices, a request for spectrum usage information.

In Example 3, the subject matter of Example 1 can optionally include analyzing received spectrum usage information to identify one or more user movement patterns, and that generating a spectrum usage map is further based on the one or more user movement patterns.

In Example 4, the subject matter of Example 1 can optionally include that the spectrum allocation change includes at least an indication of a frequency band to be used by the second one or more wireless devices.

In Example 5, the subject matter of Example 1 can optionally include that the spectrum allocation change includes at least an indication of a network channel to be used by the second one or more wireless devices.

In Example 6, the subject matter of Example 1 can optionally include that the spectrum usage information is associated with cellular communication.

In Example 7, the subject matter of Example 1 can optionally include that the spectrum usage information is associated with WiFi communication.

In Example 8, the subject matter of any one of Examples 1-7 can optionally include that the spectrum usage information includes one or more of a geographic location for a wireless device, a relative location to an access point for a wireless device, an indication of an application used by a wireless device, a bandwidth requirement for a wireless device, one or more channel conditions for a wireless device, and information relating to an interference environment of a wireless device In Example 9, the subject matter of Example 1 can optionally include receiving, by the spectrum management system, from the first one or more wireless devices, wireless device characteristics associated with each wireless device In Example 10, the subject matter of Example 9 can optionally include that the wireless device characteristics includes at least one of: a unique identifier for the wireless device: a number of radios of the wireless device; and a list of frequencies supported by the wireless device.

In Example 1, the subject matter of Example 1 can optionally include that the spectrum usage information includes usage information for licensed and unlicensed portions of spectrum.

In Example 12, the subject matter of Example 1 can optionally include that the spectrum usage information is received from the first one or more wireless devices via one or more network operators.

Example 13 is a system configured to perform any one of the methods of Examples 1-12.

Example 14 is a system for managing wireless spectrum comprising at least one memory that stores computer-executable instructions, and at least one processor configured to access the at least one memory, wherein die at least one processor is configured to execute the computer-executable instructions to receive, from a first one or more wireless devices, spectrum usage information associated with each wireless device; generate a spectrum usage map based on the received spectrum usage information: determine a spectrum usage change based on the spectrum usage map; and transmit, to a second one or more wireless devices, the spectrum usage change.

In Example 15, the subject matter of Example 14 can optionally include that the at least one processor is further configured to execute the computer-executable instructions to transmit, to the first one or more wireless devices, a request for spectrum usage information.

In Example 16, the subject matter of Example 14 can optionally include that the at least one processor is further configured to execute the computer-executable instructions to analyze received spectrum usage information to identify one or more user movement patterns, and wherein generating a spectrum usage map is further based on the one or more user movement patterns.

In Example 17, the subject matter of Example 14 can optionally include that the spectrum allocation change includes at least an indication of a frequency band to be used by the second one or more wireless devices.

In Example 18, the subject matter of Example 14 can optionally include that the spectrum allocation change includes at least an indication of a network channel to be used by the second one or more wireless devices.

In Example 19, the subject matter of Example 14 can optionally include that the spectrum usage information is associated with cellular communication.

In Example 20, the subject matter of Example 14 can optionally include that the spectrum usage information is associated with WiFi communication.

In Example 21, the subject matter of any one of Examples 14-20 can optionally include that the spectrum usage information includes one or more of a geographic location for a wireless device, a relative location to an access point for a wireless device, an indication of an application used by a wireless device, a bandwidth requirement for a wireless device, one or more channel conditions for a wireless device, and information relating to an interference environment of a wireless device In Example 22, the subject matter of Example 14 can optionally include that the at least one processor is further configured to execute the computer-executable instructions to receive, from the first one or more wireless devices, wireless device characteristics associated with each wireless device.

In Example 23, the subject matter of Example 22 can optionally include that the wireless device characteristics includes at least one of: a unique identifier for the wireless device; a number of radios of the wireless device; and a list of frequencies supported by the wireless device.

In Example 24, the subject matter of Example 14 can optionally include that the spectrum usage information includes usage information for licensed and unlicensed portions of spectrum.

In Example 25, the subject matter of Example 14 can optionally include that the spectrum usage information is received from the first one or more wireless devices via one or more network operators.

Example 26 is a computer program product comprising a computer-readable medium having computer-executable instructions embodied therein, the computer-executable instructions, when executed by at least one processor, perform operations including receiving, from a first one or more wireless devices, spectrum usage information associated with each wireless device; generating a spectrum usage map based on the received spectrum usage information; determining a spectrum usage change based on the spectrum usage map; and transmitting, to a second one or more wireless devices, the spectrum usage change.

In Example 27, the subject matter of Example 26 can optionally include that the computer-executable instructions when executed by the at least one processor further perform the operations including transmitting, to the first one or more wireless devices, a request for spectrum usage information.

In Example 28, the subject matter of Example 26 can optionally include that the computer-executable instructions when executed by the at least one processor further perform the operations comprising analyzing received spectrum usage information to identify one or more user movement patterns, and wherein generating a spectrum usage map is further based on the one or more user movement patterns.

In Example 29, the subject matter of Example 26 can optionally include that the spectrum allocation change includes at least an indication of a frequency band to be used by the second one or more wireless devices.

In Example 30, the subject matter of Example 26 can optionally include that the spectrum allocation change includes at least an indication of a network channel to be used by the second one or more wireless devices.

In Example 31, the subject matter of Example 26 can optionally include that the spectrum usage information is associated with cellular communication.

In Example 32, the subject matter of Example 26 can optionally include that the spectrum usage information is associated with WiFi communication.

In Example 33, the subject matter of any one of Examples 26-32 can optionally include that the spectrum usage information includes one or more of a geographic location for a wireless device, a relative location to an access point for a wireless device, an indication of an application used by a wireless device, a bandwidth requirement for a wireless device, one or more channel conditions for a wireless device, and information relating to an interference environment of a wireless device In Example 34, the subject matter of Example 26 can optionally include that the computer-executable instructions when executed by the at least one processor further perform the operations comprising receiving, from the first one or more wireless devices, wireless device characteristics associated with each wireless device.

In Example 35, the subject matter of Example 34 can optionally include that the wireless device characteristics includes at least one of: a unique identifier for the wireless device, a number of radios of the wireless device; and a list of frequencies supported by the wireless device.

In Example 36, the subject matter of Example 26 can optionally include that the spectrum usage information includes usage information for licensed and unlicensed portions of spectrum.

In Example 37, the subject matter of Example 26 can optionally include that the spectrum usage information is received from the first one or more wireless devices via one or more network operators.

Example 38 is an apparatus for managing wireless spectrum. The apparatus may include means for receiving, from a first one or more wireless devices, spectrum usage information associated with each wireless device; means for generating a spectrum usage map based on the received spectrum usage information; means for determining a spectrum usage change based on the spectrum usage map; and means for transmitting, to a second one or more wireless devices, the spectrum usage change.

In Example 39, the subject matter of Example 38 can optionally include means for transmitting, to the first one or more wireless devices, a request for spectrum usage information.

In Example 40, the subject matter of Example 38 can optionally include means for analyzing received spectrum usage information to identify one or more user movement patterns, and that generating a spectrum usage map is further based on the one or more user movement patterns In Example 41, the subject matter of Example 38 can optionally include that the spectrum allocation change includes at least an indication of a frequency band to be used by the second one or more wireless devices.

In Example 42, the subject matter of Example 38 can optionally include that the spectrum allocation change includes at least an indication of a network channel to be used by the second one or more wireless devices.

In Example 43, the subject matter of Example 38 can optionally include that the spectrum usage information is associated with cellular communication.

In Example 44, the subject matter of Example 38 can optionally include that the spectrum usage information is associated with WiFi communication.

In Example 45, the subject matter of any one of Examples 38-44 can optionally include that the spectrum usage information includes one or more of a geographic location for a wireless device, a relative location to an access point for a wireless device, an indication of an application used by a wireless device, a bandwidth requirement for a wireless device, one or more channel conditions for a wireless device, and information relating to an interference environment of a wireless device.

In Example 46, the subject matter of Example 38 can optionally include means for receiving, from the first one or more wireless devices, wireless device characteristics associated with each wireless device In Example 47, the subject matter of Example 46 can optionally include that the wireless device characteristics includes at least one of: a unique identifier for the wireless device; a number of radios of the wireless device; and a list of frequencies supported by the wireless device.

In Example 48, the subject matter of Example 38 can optionally include that the spectrum usage information includes usage information for licensed and unlicensed portions of spectrum.

In Example 49, the subject matter of Example 38 can optionally include that the spectrum usage information is received from the first one or more wireless devices via one or more network operators.

Example 50 is a mobile device for contributing wireless spectrum usage information. The mobile device may include at least one processor and memory; at least one location module configured to determine a location of the mobile device: a spectrum usage module configured to transmit, to a server, spectrum usage information, wherein the spectrum usage information includes at least the determined location of the mobile device; and a wireless communication module configured to: receive an indication of a change in spectrum usage, and reconfigure wireless spectrum usage of the mobile device in accordance with the received change in spectrum usage.

In Example 51, the subject matter of Example 50 can optionally include that the spectrum usage information further includes one or more of: a relative location of the mobile device as compared to one or more access points in communication with the mobile device; a relative location of the mobile device as compared to one or more cellular towers in communication with the mobile device; one or more bandwidth requirements of the mobile device; one or more applications executing on the mobile device; one or more bandwidth requirements of the one or more applications executing on the mobile device; one or more channel conditions of the mobile device; and information regarding an interference environment of the mobile device.

In Example 52, the subject matter of Example 50 or Example SI can optionally include that the spectrum usage information further includes one or more of: a number of radios of the mobile device; and one or more frequency bands associated with the radios of the mobile device.

What is claimed is:

1. A method for managing wireless spectrum, comprising:
receiving, by a spectrum management system comprising one or more computers, from a first one or more wireless mobile devices, spectrum usage information associated with each of the first one or more wireless mobile devices, wherein the spectrum usage information comprises dynamic information and static information associated with at least one of the first one or more wireless mobile devices, and wherein the spectrum usage information includes one or more of a geographic location for at least one wireless mobile device, a relative location to an access point for at least one wireless mobile device, an indication of an application used by at least one wireless mobile device, a bandwidth requirement for at least one wireless mobile device, or one or more channel conditions for at least one wireless mobile device;

identifying, by the spectrum management system, one or more user movement patterns over time based on the spectrum usage information;

generating, by the spectrum management system, a spectrum usage map based on the received spectrum usage information and the one or more user movement patterns over time, the spectrum usage map comprising a chart indicating at least the spectrum usage information and the one or more user movement patterns over time and the spectrum usage map further including a first communication network type of a first communication network used by at least one radio associated with the first one or more wireless mobile devices;

determining, by the spectrum management system, a spectrum usage change based on load information indicated in the spectrum usage map and on a roaming agreement between the first communication network and a second communication network, wherein the spectrum usage change indicates a second communication network type of the second communication network used by the at least one radio associated with the first one or more wireless mobile devices, wherein the second communication network type is a different communication network type than the first communication network type; and transmitting, by the spectrum management system to a second one or more wireless mobile devices, the spectrum usage change.

2. The method of claim 1, further comprising transmitting, by the spectrum management system, to the first one or more wireless mobile devices, a request for spectrum usage information.

3. The method of claim 1, wherein the spectrum usage change includes at least an indication of a frequency band to be used by the second one or more wireless mobile devices.

4. The method of claim 1, wherein the spectrum usage change includes at least an indication of a network channel to be used by the second one or more wireless mobile devices.

5. The method of claim 1, wherein the spectrum usage information is associated with cellular communication.

6. The method of claim 1, wherein the spectrum usage information is associated with WiFi communication.

7. The method of claim 1, further comprising receiving, by the spectrum management system, from the first one or more wireless mobile devices, wireless mobile device characteristics associated with at least one wireless mobile device.

8. The method of claim 7, wherein the wireless mobile device characteristics include at least one of: a unique identifier for the wireless mobile device; a number of radios of the wireless mobile device; and a list of frequencies supported by the wireless mobile device.

9. The method of claim 1, wherein the spectrum usage information includes usage information for licensed and unlicensed portions of spectrum.

10. The method of claim 1, wherein the spectrum usage information is received from the first one or more wireless mobile devices via one or more network operators.

11. A system for managing wireless spectrum, comprising: at least one memory that stores computer-executable instructions; and
at least one processor configured to access the at least one memory, wherein the at least one processor is configured to execute the computer-executable instructions to:
receive, from a first one or more wireless mobile devices, spectrum usage information associated with at least one of the first one or more wireless mobile devices, wherein the spectrum usage information comprises dynamic information and static information associated with at least one of the first one or more wireless mobile devices, wherein the spectrum usage information includes one or more of a geographic location for at least one wireless mobile device, a relative location to an access point for at least one wireless mobile device, an indication of an application used by at least one wireless mobile device, a bandwidth requirement for at least one wireless mobile device, or one or more channel conditions for at least one wireless mobile device;
identify, based on the spectrum usage information, one or more user movement patterns over time;
generate a spectrum usage map based on the received spectrum usage information and the one or more user movement patterns over time, the spectrum usage map comprising a chart indicating at least the spectrum usage information and the one or more user movement patterns over time and the spectrum usage map further including a first communication network type of a first communication network used by at least one radio associated with the first one or more wireless mobile devices;
determine a spectrum usage change based on load information indicated in the spectrum usage map and on a roaming agreement between the first communication network and a second communication network, wherein the spectrum usage change indicates a second communication network type of the second communication network
used by the at least one radio associated with the first one or more wireless mobile devices, wherein the second communication network type is a different communication network type than the first communication network type; and
transmit, to a second one or more wireless mobile devices, the spectrum usage change.

12. The system of claim 11, the at least one processor further configured to execute the computer-executable instructions to transmit, to the first one or more wireless mobile devices, a request for spectrum usage information.

13. The system of claim 11, wherein the spectrum usage change includes at least an indication of a frequency band to be used by the second one or more wireless mobile devices.

14. The system of claim 11, wherein the spectrum usage change includes at least an indication of a network channel to be used by the second one or more wireless mobile devices.

15. The system of claim 11, wherein the spectrum usage information is associated with cellular communication.

16. The system of claim 11, wherein the spectrum usage information is associated with WiFi communication.

17. The system of claim 11, the at least one processor further configured to execute the computer-executable instructions to receive, from the first one or more wireless mobile devices, wireless mobile device characteristics associated with at least one wireless mobile device.

18. The system of claim 17, wherein the wireless mobile device characteristics include at least one of: a unique identifier for the wireless mobile device; a number of radios of the wireless mobile device; and a list of frequencies supported by the wireless mobile device.

19. The system of claim 11, wherein the spectrum usage information includes usage information for licensed and unlicensed portions of spectrum.

20. The system of claim 11, wherein the spectrum usage information is received from the first one or more wireless mobile devices via one or more network operators.

21. A computer program product comprising a non-transitory computer-readable medium having computer-executable instructions embodied therein, the computer-executable instructions when executed by at least one processor perform operations comprising:
receiving, from a first one or more wireless mobile devices, spectrum usage information associated with at least one of the first one or more wireless mobile devices, wherein the spectrum usage information comprises dynamic information and static information associated with at least one of the first one or more wireless mobile devices, wherein the spectrum usage information includes one or more of a geographic location for at least one wireless mobile device, a relative location to an access point for at least one wireless mobile device, an indication of an application used by at least one wireless mobile device, a bandwidth requirement for at least one wireless mobile device, or one or more channel conditions for at least one wireless mobile device;
identifying, based on the spectrum usage information, one or more user movement patterns over time;
generating a spectrum usage map based on the received spectrum usage information and the one or more user movement patterns over time, the spectrum usage map comprising a chart indicating at least the spectrum usage information and the one or more user movement patterns over time and the spectrum usage map further including a first communication network type of a first communication network used by at least one radio associated with the first one or more wireless mobile devices;
determining a spectrum usage change based on load information indicated in the spectrum usage map and on a roaming agreement between the first communication network and a second communication network, wherein the spectrum usage change indicates a second communication network type of the second communication network used by the at least one radio associated with the first one or more wireless mobile devices, wherein the second communication network type is a different communication network type than the first communication network type; and
transmitting, to a second one or more wireless mobile devices, the spectrum usage change.

22. The computer program product of claim 21, the computer-executable instructions when executed by the at least one processor further perform the operations comprising transmitting, to the first one or more wireless mobile devices, a request for spectrum usage information.

23. The computer program product of claim 21, wherein the spectrum usage change includes at least an indication of a frequency band to be used by the second one or more wireless mobile devices.

24. The computer program product of claim 21, wherein the spectrum usage change includes at least an indication of a network channel to be used by the second one or more wireless mobile devices.

* * * * *

UNITED STATES PATENT AND TRADEMARK OFFICE
CERTIFICATE OF CORRECTION

PATENT NO. : 10,631,170 B2
APPLICATION NO. : 14/127406
DATED : April 21, 2020
INVENTOR(S) : Srikanteswara et al.

Page 1 of 1

It is certified that error appears in the above-identified patent and that said Letters Patent is hereby corrected as shown below:

In the Claims

In Column 19, Line 47, in Claim 11, after "network", delete "¶"

In Column 20, Line 5, in Claim 17, after "more", delete "¶"

Signed and Sealed this
Twelfth Day of January, 2021

Andrei Iancu
*Director of the United States Patent and Trademark Office*